United States Patent Office 3,113,120
Patented Dec. 3, 1963

---

3,113,120
STABILIZED CAPROLACTAM POLYMER
COMPOSITION
Patrick V. Papero, Jr., Chester, and Robert L. Morter, Jr., Hopewell, Va., assignors to Allied Chemical Corporation, New York, N.Y., a corporation of New York
No Drawing. Filed June 14, 1960, Ser. No. 36,089
10 Claims. (Cl. 260—42)

This invention relates to a polycaproamide composition which is resistant to the deteriorating effects of light, outdoor weathering, and heat.

It has been proposed to improve the aging resistance of polyamide compositions and articles by incorporating copper in the form of copper compounds which dissolve in molten polyamide whereby polyamide having copper dissolved therein and/or reacted therewith is obtained. The resulting polyamide has definitely improved aging properties as compared to the polyamide similarly produced but without copper, but there is still room for further improvement in the aging properties and there is a distinct disadvantage in that the copper present produces coloration in the polyamide product.

We have now found that when an arylsulfonic acid free of chromophoric groups, or salt thereof, especially p-toluenesulfonic acid, is included in polycaproamide compositions having copper dissolved therein, in molecular proportions of sulfonic acid:atomic proportions of copper of at least about 3:1, preferably about 10:1–500:1, the resistance of the resulting polycaproamide composition to outdoor weathering is considerably enhanced. Moreover the composition shows very good stability to light and to heat, and the color of these polycaproamide compositions is white or nearly white even though the polymer has copper dissolved therein.

We have found that our above described stabilized polycaproamide compositions are, moreover, amenable to still further improvement of their thermal stability by addition thereto of an aryl organic nitrogen or phosphorus-containing antioxidant, particularly an antioxidant based upon a diarylamine. Our preferred type of organic antioxidant ingredient is a diarylamine-ketone reaction product which is characterized by its containing the meso dialkyl acridan nucleus. Especially effective, we have found, is the high temperature, high pressure diphenylamine-acetone reaction product further reacted with formaldehyde to form a water-insoluble, solid fusible condensation product. The antioxidant can be included in amounts suitably between about 0.1% and about 25% by weight based on the weight of polycaproamide. Polymer containing as much as 10–25% of its weight of antioxidant will generally be used as a master batch, to introduce the stabilizer system into unstabilized polymer; the usual level of antioxidant in the polymer intended for end uses will ordinarily not exceed about 5% by weight based on the polymer weight.

Preferably our compositions have copper compound dissolved therein in proportions providing a content of dissolved copper between about 5 and about 500 p.p.m. by weight. Especially preferred proportions of copper compound in view of the good stability and low color obtained therewith in our compositions, are proportions providing copper content in the caprolactam polymer composition between about 10 p.p.m. and about 100 p.p.m. by weight. Proportions of the sulfonic acid preferably used are between about 0.1% and about 1% by weight of the caprolactam polymer composition. Larger amounts can be used but because the acid limits the molecular weight attainable in the polymerization of caprolactam in proportion to its concentration in the reaction mixture, the amounts used ordinarily will not exceed about 2% by weight.

It will be evident to those skilled in the art, from the fact that salts of sulfonic acids can be used instead of the acids in our compositions, that the acid function is not essential and that derivatives hydrolyzable to the acids such as esters, amides, etc. can be expected to function as equivalents of the acids.

A preferred copper compound is cupric chloride since polycaproamides having this compound dissolved therein together with specifically p-toluene-sulfonic acid incorporated therein, are particularly amenable to improvement in heat stability by addition thereto of an antioxidant based upon a diarylamine; have a good white color; and afford yarns which dye much more deeply than yarns from compositions based on certain other copper compounds.

The following examples describe completely specific embodiments illustrative of our improved compositions and methods of obtaining them; but it is to be understood that the invention is not limited to all details of the examples.

EXAMPLE I

The following materials were charged to a stirred 1500 ml. Erlemeyer glass flask in the order given:

800 g. ε-carpolactam
8 g. distilled water
7.2 g. p-toluenesulfonic acid—i.e. 0.042 gram-molecule
0.08 g. cupric phosphate trihydrate ($Cu_3(PO_4)_2.3H_2O$), i.e. 0.00055 gram-atom of copper The reactants were heated to 80–90° C. and thoroughly mixed until a solution was formed; the solution was then charged to a 1500 ml. glass resin flask. The resin flask was equipped with a stainless steel type 316 anchor-type agitator and stuffing box, a vertical condenser so arranged that either water or steam may be admitted to the jacket, a thermocouple in a stainless steel well, an inlet for nitrogen and an electric heating mantle.

After the solution had been charged, the resin flask was purged free of air with dry nitrogen containing less than 5 p.p.m. oxygen. A blanket of this oxygen-free nitrogen was maintained under a back pressure of one inch of water in the vessel throughout all of the subsequent operations described below.

The reactants were polymerized using the following time-temperature cycle:

7 hours—90–210° C.
1 hour—210° C. (reflux)
5½ hours—210–255° C.
12 hours—255° C. (reaction)

During the period of heating up and refluxing (90–210° C.), the resin flask was maintained at total reflux; cold water was used on the condenser and all distillate was returned to the reaction. When the temperature reached 210° C. (approximate boiling point of 99% lactam and 1% water), the reaction was maintained at this temperature for one hour. At the end of the period of refluxing the flow of water to the condenser was shut off and a flow of low pressure steam through the condenser jacket was maintained during the subsequent polymerization operations. The use of superheated steam in the condenser facilitates the removal of water from the reaction mass during polymerization.

The mixture was next heated to 255° C. in 5½ hours, during which time water was continually removed (kettle on zero reflux). The distillate contained approximately 2-3% lactam. The contents of the resin flask began to thicken noticeably at 230-235° C. The reaction temperature of about 255° C. was maintained for 12 hours. During this period the polymeric chains continued to form and reached an equilibrium state because of the chain-terminating property of the sulfonic acid employed, as indicated by levelling of the viscosity of the polymer product.

At the end of the heating period the agitator was stopped; the thermowell and agitator were pulled up and out of the melt; and the electric heating mantle jacket was turned off and removed from around the vessel, allowing the molten polymer to solidify. Air was prevented from coming in contact with the molten mass by continuing the flow of nitrogen through the vessel until the polymer had cooled to about 50°-60° C.

After the polymer had solidified and cooled, the apparatus was dismantled and the bar of polymer was removed. The bar, approximately 4 inches in diameter and 6 inches long was cut into cubes (½ inch x ½ inch x ½ inch) and ground in a Wiley mill to pass through a No. 20 standard sieve (840 micron openings).

The ground polymer was then washed in a suitable agitated glass apparatus with distilled water at 100° C. (ratio polymer to water 1:1.2) for 2 hours; the water was removed and fresh, previously boiled distilled water (free from air) was added in the same ratio. A total of 5 washings was made and the polymer was then placed in a stainless steel tray for drying. During these operations a blanket of nitrogen was always used when polymer was exposed to the atmosphere.

The washed polymer was dried under a vacuum of 30 inches of mercury at 85° C. until analysis indicated a content of water below 0.1% (about 48 hours).

The dried polymer was tested for formic acid relative viscosity by ASTM Method D-789-53T.

The polymer was spun and drawn into a 10-filament yarn having weight approximately 60 denier after being drawn in a conventional manner.

The yarn, wound on aluminum bobbins 2 inches x 2 inches in dimension at 0.5 gram per denier tension, was exposed to accelerated weathering and light stability tests as follows:

A. *Exposure in an Atlas weatherometer.* — Samples were exposed to carbon arc radiation of 3000-7000 A. wavelength. A distilled water spray was given 10 minutes each hour. The temperature of the unit was maintained at 140°-160° F.

B. *Exposure to ultraviolet radiation of 2537 A. wavelength.*—Samples were exposed in a geometric pattern to radiation from germicidal type fluorescent bulbs for 96 hours. The samples were constantly rotated for even exposure. The relative humidity was maintained at approximately 65%.

C. *Exposure to ultraviolet radiation of 4000 A. wavelength.*—Samples were exposed in a geometric pattern to radiation from a Sylvania RS sunlight bulb for 45 days at room temperature. The samples were constantly rotated for even exposure. The relative humidity was maintained at approximately 65%.

D. *Exposure to fluorescent light of 4000-7000 A. wavelength.*—Samples were exposed for 45 days as in test "C" above to light from fluorescent bulbs principally in the visible region, 4000-7000 A.

Outdoor exposure tests were made as follows:

Yarn samples, rewound at tension of 0.5 gram per denier on bobbins 2 inches x 6 inches in dimension, were placed on an outdoor rack inclined at 45 degrees facing due south. The samples were tested ever 30 days until they had lost more than 50% of their original strength. Control samples were made by polymerizing by the procedure of this Example I except that no salt or acid was used, the polymerization being regulated by the water vapor pressure maintained in the reaction vessel atmosphere to afford about the same formic acid relative viscosity in the comparison samples; the samples were spun and drawn as above. The control yarns were exposed simultaneously with the test yarns.

Table I represents results of such tests, illustrating the thermal and light stability of polycaproamide yarns prepared from compositions of this invention. It also indicates the effect of varying concentrations of p-toluenesulfonic acid on the light and weathering stability of the various polyamide compositions.

*Table I*

PERCENT IN ULTIMATE TENSILE STRENGTH

| No. | Wgt. Percent PTSA [1] | Wgt. Percent Copper Phosphate [2] | Accelerated Weathering [3] | | | Outdoor Exposure [3] | | | | |
|---|---|---|---|---|---|---|---|---|---|---|
| | | | W.O.[4] | U.V.[5] | Fluor.[6] | 30 Days | 60 Days | 90 Days | 120 Days | 150 Days |
| Yarn 1 | 0.9 | 0 | 19 | 21 | 0 | 5 | 14 | 26 | 55 | 71 |
| Control 1 | 0 | 0 | | | | 15 | 36 | 55 | 62 | 83 |
| Yarn 2 | 0.9 | .01 | 13 | 14 | 7 | 11 | 11 | 18 | 23 | 26 |
| Control 2 | 0 | 0 | | | | 10 | 23 | 31 | 43 | 53 |
| Yarn 3 | 0.6 | .01 | 21 | 35 | 12 | 29 | 30 | 29 | 29 | 36 |
| Control 3 | 0 | 0 | | | | 29 | 42 | 44 | 51 | 54 |
| Yarn 4 | 0.4 | .01 | 29 | 31 | 18 | 16 | 36 | 43 | 45 | |
| Control 4 | 0 | 0 | | | | 47 | 68 | 74 | 74 | |

[1] p-Toluene sulfonic acid, weight percent based on caprolactam.
[2] Cu₃(PO₄)₂·3H₂O.
[3] Figures listed are percent losses in ultimate tensile strength of the test sample compared to a sample of the same yarn before exposure.
[4] Weatherometer exposure of (A) above, 92 hours.
[5] Ultraviolet exposure of (C) above.
[6] Fluorescent exposure of (D) above.

Remarks on Table I:

(1) The weathering resistance of the yarns with the additives tested is clearly superior to that of the controls.

(2) Higher concentrations of p-toluenesulfonic acid, with a given concentration of copper phosphate, improve both light and weathering resistance of the yarns.

(3) Visual observation showed that higher concentrations of the p-toluenesulfonic acid, with a given concentration of copper phosphate, increase the whiteness of the resultant yarns.

EXAMPLE II

A reactor, 227 liters in size, equipped with an anchor type agitator and horizontal water condenser, Dowtherm heated, and having only stainless steel types 304 and 316 in contact with the reactants and product, was charged with the following:

190 kg. e-caprolactam
0.572 kg. p-toluenesulfonic acid—i.e. 3.3 gram-molecules
21.2 kg. distilled water
0.0187 kg. cupric phosphate trihydrate—i.e. 0.13 gram-atom of copper The charge was polymerized generally as in Example I under about 4 inches of water back pressure of nitrogen on the polymerization kettle. The following polymerization cycle was employed:

7 hours—60–210° C.
1 hour—210° C. (reflux)
5½ hours—210–255° C.
14 hours—255° C. (on temperature)

The polymeric material was extruded as a ribbon over a 3-hour period under pressure of moist inert gas saturated with water at 90°–95° C. The ribbon was pelleted into chips 0.1 x 0.1 inch in size. The chips were then washed at 100° C. with distilled water for 2 hours at a water to polymer ratio of 1.2:1; a total of 5 washings was made. The polymer was then dried at 100° C. using a heated dry, oxygen-free nitrogen stream until the moisture content was reduced to less than 0.1%.

The chips were then melt spun, using extruder type melt spinning apparatus, into 32-filament yarn having an undrawn denier of approximately 1050. After drawing the yarn had a denier of 210.

The finished yarn was evaluated by the accelerated testing methods above described and by outdoor exposure as above described. The results obtained are shown opposite "Ex. II" in Table II below.

EXAMPLE III

Using essentially the procedure described in Example II the following charge was polymerized:

190 kg. e-caprolactam
0.858 kg. p-toluenesulfonic acid—i.e. 4.9 gram-molecules
1.925 kg. distilled water
0.0144 kg. cupric potassium chloride dihydrate ($CuCl_2 \cdot 2KCl \cdot 2H_2O$)—i.e. 0.045 gram-atom of copper

EXAMPLE IV

Using essentially the procedure described in Example II, the following charge was polymerized:

183 kg. e-caprolactam
0.892 kg. p-toluenesulfonic acid—i.e. 5.2 gram-molecules
1.848 kg. distilled water
0.0213 kg. cupric chloride dihydrate ($CuCl_2 \cdot 2H_2O$)—i.e. 0.125 gram-atom of copper Yarn was spun from the polymer of Example III and from that of Example IV as in Example II and was evaluated as in Example II. Additionally the thermal stability was determined as follows:

Samples of the test yarns were wound under constant tension of 0.5 gram per denier on 2 inch x 2 inch aluminum bobbins and then placed on a revolving rack (20 r.p.m.) in a forced draft oven maintained at 165±2° C. After exposure the yarns were allowed to stand for a minimum period of 2 hours in an atmosphere controlled at 65% relative humidity. The yarns were tested before and after exposure by total destruction on a Scott IP-4 tensilgraph. Results are reported as percent loss in ultimate tensile strength (abbreviated as UTS) as compared to the ultimate tensile strength of the yarn before exposure.

The following Tables II and III (A and B) show the results of tests of the above-described yarns and of tests of other yarns (Exs. V–IX) produced by essentially the same procedures except as indicated in the tables. Also the tables show results of tests on yarns similarly produced but omitting salt and acid in the polymerization, designated "Controls," tested in the same manner as the yarns of the examples. Tables II and III also show results with commercial aging-stabilized nylon 66 yarns tested for comparison in the same manner as the yarns of the examples.

*Table II*

ACCELERATED LIGHT STABILITY AND OUTDOOR WEATHERING

[Determined as above described for Table I]

| Yarn | Wgt. Percent PTSA [1] | Wgt. percent of Copper Salt | Cu, p.p.m. | Yarn Denier | Yarn No. of Fils | W. O. 198, hrs. (A) | U. V. 2537 A. 96, hrs. (B) | U. V. 4000 A. 45, days (C) | Fluor. 4000–7000 A. 45, days (D) | Outdoor Exposure (Days) 30 | 60 | 90 | 120 |
|---|---|---|---|---|---|---|---|---|---|---|---|---|---|
| Ex. II | 0.30 | 0.01 Cu₃(PO₄)₂·3H₂O | 44 | 210 | 32 | 9 | 26 | 11 | 6 | 8 | 22 | 29 | 30 |
| Nylon 66 | | (Stabilized) | | 210 | 34 | 24 | 44 | 22 | 17 | 19 | 29 | 35 | |
| Ex. III | 0.45 | 0.023 CuCl₂·2KCl·2H₂O | 45 | 210 | 32 | 36 | 35 | 13 | 8 | 26 | 43 | 51 | 55 |
| Nylon 66 | | (Stabilized) | | 210 | 34 | 24 | 53 | 22 | 17 | 19 | 29 | 35 | |
| Ex. IV | 0.50 | 0.012 CuCl₂·2H₂O | 45 | 210 | 32 | 16 | 42 | 13 | | 6 | 9 | 7 | 20 |
| Nylon 66 | | (Stabilized) | | 210 | 34 | 12 | 44 | 19 | | 14 | 15 | 18 | 21 |
| Ex. VI | 0.50 | 0.02 CuCl₂·2KCl·2H₂O | 40 | 840 | 136 | 10 | 41 | 35 | | 15 | 31 | 33 | 35 |
| Nylon 66 | | (Stabilized) | | 840 | 140 | 13 | 46 | 32 | | 18 | 40 | 43 | 45 |
| Ex. VII | 0.50 | 0.012 CuCl₂·2H₂O | 45 | 840 | 136 | 11 | 30 | 5 | | | | | |
| Nylon 66 | | (Stabilized) | | 840 | 140 | 13 | 46 | 15 | | | | | |

[1] p-Toluenesulfonic acid, weight percent based on caprolactam.

(A) Weatherometer exposure of (A) above.
(B) Ultraviolet exposure of (B) above.
(C) Ultraviolet exposure of (C) above.
(D) Fluorescent exposure of (D) above.

*Table III(A)*

THERMAL STABILITY

[Determined as above described following Example IV]

| Yarn | Wgt. Percent PTSA [1] | Wgt. Percent of Copper Salt | Cu, p.p.m. | Relative Formic Acid Viscosity of Polymer [2] | Yarn | | Thermal Stability at 165° C. [3] | | |
|---|---|---|---|---|---|---|---|---|---|
| | | | | | Denier | No. of Fils | 36 Hours | 48 Hours | 100 Hours |
| Ex. II | 0.30 | 0.01 Cu₃(PO₄)₂.3H₂O | 44 | 59.7 | 210 | 32 | 7 | 11 | 21 |
| Ex. III | 0.45 | 0.023 CuCl₂.2KCl.2H₂O | 45 | 58.4 | 210 | 32 | 5 | 9 | 22 |
| Ex. IV | 0.50 | 0.012 CuCl₂.2H₂O | 45 | 57.7 | 210 | 32 | 9 | 14 | 22 |
| Control A | 0 | 0 | 0 | 55.7 | 200 | 16 | *71 | | |
| Nylon 66 | | (Stabilized) | | | 210 | 34 | 10 | 23 | 29 |
| Ex. V | 0.30 | 0.012 CuCl₂.2H₂O | 45 | 69.9 | 840 | 136 | 7 | | |
| Ex. VI | 0.50 | 0.02 CuCl₂.2KCl.2H₂O | 40 | 47.2 | 840 | 136 | 25 | 33 | 24 |
| Ex. VII | 0.50 | 0.012 CuCl₂.2H₂O | 45 | 53.4 | 840 | 136 | 12 | 14 | |
| Nylon 66 | | (Stabilized) | | 46.0 | 840 | 140 | 17 | 22 | 29 |

[1] Para-toluenesulfonic acid, weight percent based on caprolactam.
[2] ASTM Method No. D-789-53T.
[3] Figures listed are percent loss in ultimate tensile strength after the number of hours exposure shown in the heading.
*Samples exposed for 24 hours only.

*Table III(B)*

THERMAL STABILITY

[Determined as above described following Example IV]

| Yarn | Wgt % PTSA [1] | Wgt. percent of additives | Cu, p.p.m. | Relative Formic Acid Viscosity of Polymer [2] | Yarn | | Thermal Stability at 165°C. [3] | | |
|---|---|---|---|---|---|---|---|---|---|
| | | | | | Denier | No. of Fils | 36 Hours | 48 Hours | 100 Hours |
| Ex. VIII | 0.50 | 0.02 CuCl₂.2KCl.2H₂O plus 0.7 antioxidant.[4] | 40 | 47.2 | 840 | 136 | 14 | 11 | |
| Ex. IX | 0.50 | 0.012 CuCl₂.2H₂O plus 0.75 antioxidant.[4] | 45 | 55.6 | 840 | 136 | 2 | 4 | 15 |
| Control B | 0 | 0.10 Antioxidant [4] | 0 | 58.7 | 840 | 136 | 59 | | |
| Control C | 0 | 0.20 Antioxidant [4] | 0 | 58.7 | 840 | 136 | 48 | | |
| Control D | 0 | 0.75 Antioxidant [4] | 0 | 58.7 | 840 | 136 | 23 | | 58 |

[1] Para-toluenesulfonic acid, weight percent based on caprolactam.
[2] ASTM Method No. D-789-53T.
[3] Figures listed are percent loss in ultimate tensile strength after the number of hours exposure shown in the heading.
[4] A rubber antioxidant, "Flexamine," which is about 35% by weight N,N'-diphenyl-p-phenylenediamine and 65% by weight reaction product of acetone and diphenylamine formed at relatively high temperatures and high pressures, containing the meso-dimethyl acridan nucleus, and further reacted with formaldehyde to form a water-insoluble solid, fusible condensation product as described in U.S. Patent 1,906,935 of May 2, 1933 to Horst, in particular in Example A and Example I thereof. Said reaction product of acetone and diphenylamine is supplied by the Naugatuck Chemical Division of United States Rubber Co. under the trade name "BXA." "BXA" is described by the supplier as having specific gravity 1.10; melting range 85 to 95° C.; soluble in acetone, benzene ethylene dichloride; insoluble in water and gasoline. The antioxidant "Flexamine" is also supplied by Naugatuck. It is described by the supplier as having specific gravity 1.20; melting range 75° C. to 90° C.; soluble in acetone, benzene, ethylene dichloride; insoluble in water and gasoline. The "Flexamine" was incorporated in the polymer by dissolving in caprolactam (15 parts per 100 parts by weight of aqueous 99% lactam) and polymerizing at 255° C. under atmospheric pressure generally as in Ex. I above; then pelleting and blending to the specified concentrations with polymer pellets produced essentially by the procedure of that example above in which the stated copper salt was used.

Remarks on Table III:

(A) The outstanding thermal stability imparted to polycaproamide yarns by use of the various copper salts in conjunction with p-toluenesulfonic acid even up to 100 hours exposure at 165° C. is evidenced by the results obtained, compared to the controls containing no additive and containing increasing amounts of antioxidant but no copper. The yarns obtained had a good white color.

(B) The addition of the cited antioxidant further markedly improved the thermal stability of the yarns from the polycaproamide/copper salt/p-toluenesulfonic acid compositions—compare Ex. VIII vs. Ex. VI and Ex. IX vs. Ex. VII. The yarns produced using this antioxidant were colored tan.

As shown in the above tables, the light and weathering stability of polycaproamide having various polyamide-soluble copper salts and p-toluenesulfonic acid incorporated therein is excellent. The most effective copper salts impart stability to light and weathering equalling and exceeding that of the commercial aging-stabilized nylon 66 samples tested for comparison.

p-Toluenesulfonic acid has the important effect as above noted of repressing to an acceptable level the coloration of the polymer which results from the presence of copper. Colorless reducing agents, we have found, still further repress the coloration. These include previously proposed additives for nylon such as potassium iodide, phosphorous acid, hypophosphorous acid compounds, etc.

Besides the above noted functions, p-toluene-sulfonic acid also has the function of limiting viscosity attainable in the polymerization, when used in amounts of about 0.1% by weight and greater. Thus, in polymerizations conducted as in Example I above using 0.6% p-toluenesulfonic acid, a steady polymer viscosity of about 1.60 (reduced viscosity at 0.52% concentration in meta-cresol at 25° C.) was reached after about 18 hours at 255° C.; and using 0.9% p-toluenesulfonic acid a steady meta-cresol reduced viscosity of the polymer of about 1.10 was reached after about 9 hours at 255° C. Accordingly it should be understood that when p-toluenesulfonic acid is present in molten polycaproamide it probably undergoes a reaction with end groups of the polymer. In the claims below, the p-toluenesulfonic acid thus present is described as "incorporated" in the polycaproamide.

In Table IV below, examples using various arylsulfonic acids or normal salts thereof instead of p-toluenesulfonic acid are presented.

Table IV

| Yarn | Additives | | Color of yarn | Percent Loss in Ultimate Tensile Strength | | | | | | |
|---|---|---|---|---|---|---|---|---|---|---|
| | Sulfonic Cmpd. and Conc.[1] | $CuCl_2 \cdot 2H_2O$ Conc.[1] and p.p.m. | | Thermal Stability | | Weatherometer | Outdoor Exposure (Days) | | | |
| | | | | 36 hrs. | 100 hrs. | 92 hrs. | 30 | 60 | 90 | 120 |
| Ex. X | ⌬—HSO₃  0.5% | 0.0114%, 43 p.p.m. | Off-White | 9 | 37 | 10 | | | | |
| Ex. XI | Cl—⌬—SO₃Na  0.5% | 0.0114%, 43 p.p.m. | White | 2 | 21 | 10 | | | | |
| Ex. XII | NH₂—⌬—SO₃H  0.3% | 0.012%, 45 p.p.m. | Light Lavender | 11 | 22 | 10 | *10 / 10 | *7 / 11 | *9 / 12 | |
| Ex. XIII | HO—⌬(NH₂)—SO₃H  0.3% | 0.012%, 45 p.p.m. | Light Tan | 5 | 21 | 5 | *10 / 11 | *7 / 12 | *9 / 18 | |
| Ex. XIV [2] | NH₂—⌬(NaOSO₃)(SO₃Na)  0.3% | 0.012%, 45 p.p.m. | ......do...... | 10 | 20 | 7 | *10 / 13 | *7 / 17 | *9 / 21 | |
| Ex. XV [3] | (HOSO₂)—⌬⌬(NH₂)(HOSO₂)  0.3% | 0.012% 45 p.p.m. | Light Yellow | 4 | 12 | 7 | *10 / 13 | *7 / 12 | *9 / 17 | |
| Ex. XVI | HSO₃—⌬(CH₃)(CH₃)  0.3% | 0.012%, 45 p.p.m. | Off-White | 0 | | 0 | | | | |
| Ex. XVII | ⌬⌬—SO₃H  0.5% | 0.0114%, 43 p.p.m. | Off-White Grayish Green Tint. | 0 | 8 | | | | | |

[1] Concentration in weight percent based on caprolactam.
*Top figure is percent loss in ultimate tensile strength of the stabilized nylon 66 yarn control (210 denier, 34 filament count).
[2] Aniline 2,5-disulfonic acid Na salt.
[3] 1-naphthylamine-4,7-disulfonic acid.

We have found that certain other arylsulfonic acids, but not all arylsulfonic acids, function generally similarly to p-toluenesulfonic acid. Those acids which are effective are free of chromophoric groups, such as carbonyl, phenylvinylene, etc. attached to the aryl nucleus. The examples and tests tabulated above in Table IV were carried out essentially as for Example II and Tables I–III above, but substituting for p-toluene-sulfonic acid of Example II, the sulfonic acids shown in Table IV, in the weight percents shown. Examples XII–XV inclusive were run simultaneously in the outdor exposure tests, together with a similar 210 denier-34 filament aging-stabilized nylon 66 yarn for comparison. It will be noted that none of these yarns equalled the nylon 66 yarn in weathering stability, whereas the similar yarn of Example IV in Table II, having p-toluenesulfonic acid incorporated therein, was equal or superior in light and weathering stability to the like nylon 66 yarn tested for comparison. The yarn of Example XVI having 2,5-dimethyl-benzenesulfonic acid incorporated therein appears to have excellent light and weathering stability and has nearly white color. Conformably to the foregoing, preferred arylsulfonic compounds for use in our compositions are the methyl-substituted arylsulfonic compounds, especially the methyl-substituted benzenesulfonic acids and above all, p-toluenesulfonic acid.

In the above examples the copper compound and p-toluenesulfonic acid were added in the polymerization charge. However, these additives can be added later in the polymerization cycle. Addition thereof to the finished molten polymer followed by homogenization by extrusion is also possible; as is blending of the additives with solid polycaproamide pellets in a suitable blending apparatus, followed by melt extrusion and repelleting.

Copper compounds soluble in polyamides which can be employed are cuprous and cupric compounds, e.g. copper salts of organic or inorganic acids, including the copper compounds proposed heretofore for stabilization of polyamides such as those of French Patent 906,893 délivré June 4, 1945 (I.G.) and metallic copper powder (which is observed to react with or dissolve in polyamides); also copper butyrate, citrate, lactate, oleate, oxalate, stearate and tartrate; also copper benzoate and hydroxybenzoic acid salts of copper such as copper salicylate; also the sulfonic acid copper salts including copper p-toluenesulfonate and copper phenolsulfonate; etc.

Instead of the specific antioxidant employed in Examples VIII and IX of Table III, others of the aryl organic, nitrogen or phosphorus containing types can be employed and will also improve the thermal stability of yarn produced from the resulting compositions. Examples include other diarylamine-ketone reaction products containing the meso-dialkyl acridan nucleus, both relatively high temperature, high pressure liquid products such as "BLE 25" supplied by Naugatuck Chemical Division and relatively low temperature, low pressure solid reaction products such as "Aminox" and "Betanox Special" supplied by Naugatuck Chemical Division; also substituted diphenyl amines such as alkylated diphenylamines e.g. "Agerite Stalite" of R. T. Vanderbilt Co., and para-(p-toluene-sulfonylamido) diphenyl amine; also diaryl-p-phenylene diamines such as "Wingstay 100" supplied by Goodyear Tire & Rubber Co.; also alkylated aryl phosphite, e.g. Naugatuck's "Polygard," etc.

These antioxidants are used suitably in amounts between 0.1% and 5% by weight. They appear to operate in presence of the copper compound to produce greater resistance to heat degradation in polycaproamide than is obtainable with antioxidant alone, particularly higher resistance to breaking at elevated temperatures and under load than obtained with copper alone or with antioxidant alone. For example a yarn generally as in Example IX of Table III above was tested for thermal stability under load as follows:

840 denier, 136 filament yarn was spun from a polycaproamide composition and drawn essentially as for Example IX above, except that the antioxidant consisted of only the "BXA" diphenylamine-acetone condensation product after-treated with formaldehyde, used as the major ingredient of the antioxidant of Example IX.

Samples of the yarn were exposed in a single layer on 2 inch aluminum bobbins in an air-circulating oven regulated at 165±2° C. for 2, 4, 8 and 16 hours. The samples were then conditioned for 2 hours at 65% relative humidity. Under a 2000 gram load, the samples were then subjected to increasing temperatures, increasing at 1° C. per 48 seconds until the sample broke.

The results are shown in Table V which follows, together with results on a like yarn containing no copper.

Table V

| Hours Exposed at 165° C. | Breaking Temperatures | |
|---|---|---|
| | Yarn Containing Anti-Oxidant as above but No Copper or Sulfonic Acid | Yarn Containing Copper, p-Toluene-sulfonic Acid, and Antioxidant |
| 0 | 232 | 230 |
| 2 | 220 | 230 |
| 4 | 222 | 229 |
| 8 | 218 | 220 |
| 16 | 207 | 224 |

The polymers of caprolactam which can be improved in accordance with this invention are typified by the homopolymers of the above examples, but include homopolymers otherwise produced, e.g. using catalysts and/or viscosity stabilizers such as adipic acid, hexamethylene diamine, benzylamine-4-carboxylic acid, etc.; and also include copolymers, e.g. with adipic acid-hexamethylene diamine salt, or with an amino acid, wherein a substantial proportion of the constituents is polymerized caprolactam.

The polymers and yarns of this invention can be modified by the addition of materials such as delustrants, pigments, fillers, resins, plasticizers, and others conventionally used in polymer compositions.

The yarns of this invention can be dyed, the dyeability being dependent upon the copper compound employed. Cupric phosphate and cupric chloride additives afford yarns which dye much more deeply than yarns containing other copper compounds, e.g. cupric acetate.

The compositions of this invention containing a copper salt and "BXA" antioxidant with or without other materials, e.g. as in Example IX hereof and Table V hereof, are especially suited for production of tire yarn and yarn for marine and other outdoor uses. This special utility is due to the unusual combination of high drawability of filaments spun from these compositions giving high tenacities, and their excellent aging resistance against both heat and atmospheric influences as above outlined.

We claim:

1. A polycaproamide stabilized against aging, having copper dissolved therein and in which is incorporated at least 3 molecular proportions per atomic proportion of copper, of at least one sulfonic compound of the group consisting of arylsulfonic acids and derivatives hydrolyzable thereto, free of chromophoric groups.

2. Composition as defined in claim 1 wherein the copper is present in amounts between about 5 and about 500 parts per million by weight based on the polycaproamide and the sulfonic compound present is paratoluenesulfonic acid in amount between about 0.1% and about 2% by weight based on the polycaproamide.

3. The composition as defined in claim 2 wherein there is additionally present a diarylamine-ketone reaction product containing the meso-dialkyl acridan nucleus.

4. Composition as defined in claim 1 wherein copper is present in amounts between about 10 and about 100 parts per million by weight based on the polycaproamide and the sulfonic compound present is para-toluenesulfonic acid in amount between about 0.1% and about 1% by weight of the polycaproamide.

5. Composition as defined in claim 4 wherein the copper is incorporated as cupric chloride.

6. Composition as defined in claim 4 wherein there is additionally present a high temperature, high pressure reaction product of diphenylamine and acetone, further reacted with formaldehyde to form therefrom a water-insoluble solid, fusable condensation product.

7. Composition as defined in claim 6 in the form of a drawn filament.

8. Composition as defined in claim 1 wherein there is additionally present at least one organic anti-oxidant of the group consisting of diarylamine-ketone reaction products containing the meso-dialkyl acridan nucleus; alkylated diphenylamines; para-(para-toluene-sulfonylamido)-diphenylamine; diaryl-para-phenylene diamines; and alkylated aryl phosphates.

9. Composition as defined in claim 1 wherein the sulfonic compound is a methyl-substituted benzene-sulfonic acid.

10. Composition of claim 2 wherein copper compound and para-toluenesulfonic acid are the sole ingredients of

13 the composition imparting thereto stability to outdoor weathering and to heat.

References Cited in the file of this patent

UNITED STATES PATENTS

| | | |
|---|---|---|
| 1,906,942 | Horst | May 2, 1933 |
| 2,476,661 | Hart | July 19, 1949 |
| 2,560,053 | Webb | July 10, 1951 |
| 2,705,227 | Stamatoff | Mar. 29, 1955 |
| 2,960,489 | Gabler et al. | Nov. 15, 1960 |
| 3,003,995 | Schule | Oct. 10, 1961 |

---

UNITED STATES PATENT OFFICE
CERTIFICATE OF CORRECTION

Patent No. 3,113,120            December 3, 1963

Patrick V. Papero, Jr., et al.

It is hereby certified that error appears in the above numbered patent requiring correction and that the said Letters Patent should read as corrected below.

Columns 3 and 4, Table I, in the title to the table, after "PERCENT" insert -- LOSS --; column 4, line 33, for "ever" read -- every --; column 9, line 70, for "outdor" read -- outdoor --; column 12, lines 13 and 14, for "conventionly" read -- conventionally --; line 69, for "phosphates" read -- phosphites --.

Signed and sealed this 28th day of April 1964.

(SEAL)
Attest:

ERNEST W. SWIDER            EDWARD J. BRENNER

Attesting Officer            Commissioner of Patents the composition imparting thereto stability to outdoor weathering and to heat.

References Cited in the file of this patent

UNITED STATES PATENTS

| | | |
|---|---|---|
| 1,906,942 | Horst | May 2, 1933 |
| 2,476,661 | Hart | July 19, 1949 |
| 2,560,053 | Webb | July 10, 1951 |
| 2,705,227 | Stamatoff | Mar. 29, 1955 |
| 2,960,489 | Gabler et al. | Nov. 15, 1960 |
| 3,003,995 | Schule | Oct. 10, 1961 |

---

UNITED STATES PATENT OFFICE
CERTIFICATE OF CORRECTION

Patent No. 3,113,120           December 3, 1963

Patrick V. Papero, Jr., et al.

It is hereby certified that error appears in the above numbered patent requiring correction and that the said Letters Patent should read as corrected below.

Columns 3 and 4, Table I, in the title to the table, after "PERCENT" insert -- LOSS --; column 4, line 33, for "ever" read -- every --; column 9, line 70, for "outdor" read -- outdoor --; column 12, lines 13 and 14, for "conventionly" read -- conventionally --; line 69, for "phosphates" read -- phosphites --.

Signed and sealed this 28th day of April 1964.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,113,120

December 3, 1963

Patrick V. Papero, Jr., et al.

It is hereby certified that error appears in the above numbered patent requiring correction and that the said Letters Patent should read as corrected below.

Columns 3 and 4, Table I, in the title to the table, after "PERCENT" insert -- LOSS --; column 4, line 33, for "ever" read -- every --; column 9, line 70, for "outdor" read -- outdoor --; column 12, lines 13 and 14, for "conventionly" read -- conventionally --; line 69, for "phosphates" read -- phosphites --.

Signed and sealed this 28th day of April 1964.

(SEAL)
Attest:

ERNEST W. SWIDER
Attesting Officer

EDWARD J. BRENNER
Commissioner of Patents